Feb. 24, 1959            B. H. PINCKAERS            2,875,392
CONDITION RESPONSIVE APPARATUS FOR
CONTROLLING AN ELECTRIC MOTOR
Filed May 25, 1955

INVENTOR
B. H. PINCKAERS

BY Frederick E. Lange

ATTORNEY

United States Patent Office 2,875,392
Patented Feb. 24, 1959

2,875,392

CONDITION RESPONSIVE APPARATUS FOR CONTROLLING AN ELECTRIC MOTOR

Balthasar Hubert Pinckaers, Minneapolis, Minn., assignor to Minneapolis-Honeywell Regulator Company, Minneapolis, Minn., a corporation of Delaware Application May 25, 1955, Serial No. 510,967

5 Claims. (Cl. 318—298)

This invention relates generally to condition responsive apparatus and more particularly to new and improved transistor control circuits wherein a device is controlled in accordance with the output of a condition responsive device.

In the prior art, condition responsive apparatus of this type generally consisted of a device which would provide a condition responsive means to modulate a source of alternating current, an amplifier and a demodulating or discriminating means to operate the controlled device. This of course required sources of alternating and direct potential. It will be seen that in my invention I have provided a condition responsive apparatus which is composed of a minimum number of components and requires only direct current to accomplish its function.

It is therefore an object of my invention to provide a transistor control circuit wherein a device may be differentially controlled from a transistor amplifier in response to a means adapted to vary the conductivity of the amplifying means.

These and other object of my invention will be understood on a reading of the appended specification, drawing and claims.

Figure 1:
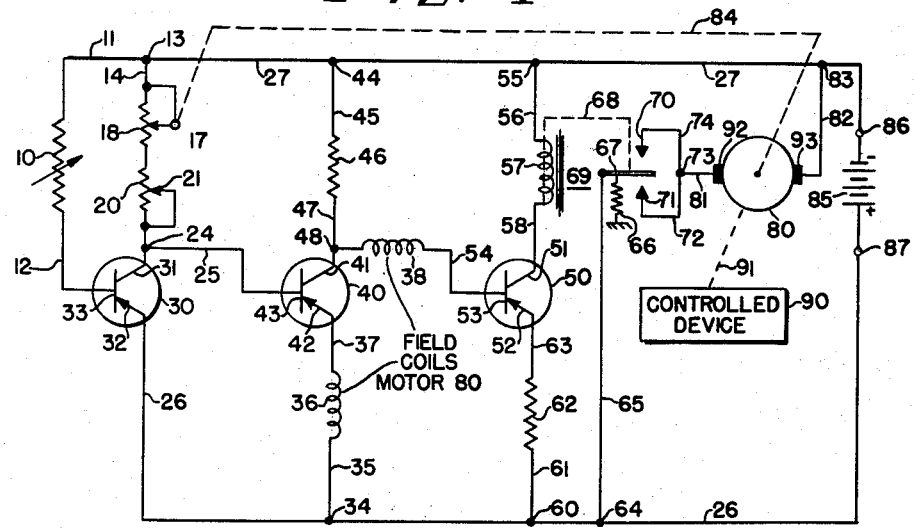

In Figure 1 I have shown one embodiment of my invention wherein a rebalance arrangement is utilized and a relay is used to control the operation of the motor.

Figure 2:
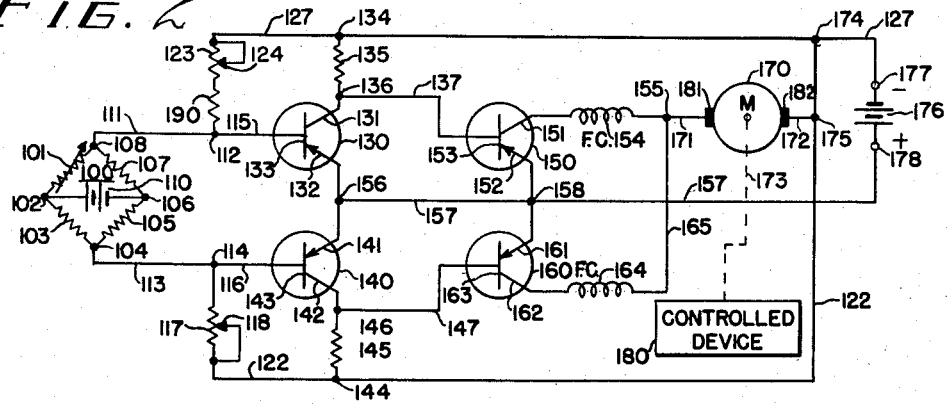

In Figure 2 I have shown a second embodiment of my invention.

Figure 3:
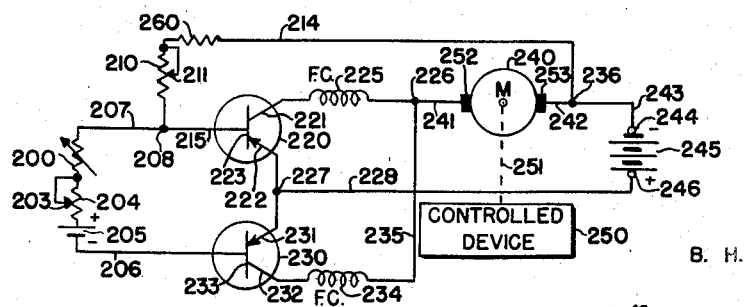

Figure 3 is a third embodiment of my invention.

Referring now to Figure 1 wherein I have shown condition responsive apparatus which comprises temperature responsive resistance means 10 which is connected to transistor 30 to control the conductivity thereof, second and third transistors 40 and 50, each being controlled successively from its preceding transistor, electrical translating means shown as motor 80, operatively connected to controlled device 90 and to rebalance potentiometer 18, and a battery 85 connected to energize the condition responsive apparatus.

A transistor 30 having collector electrode 31, emitter electrode 32, and base electrode 33, is shown with emitter electrode 32 connected to positive terminal 87 on battery 85 through positive lead 26, base electrode 33 connected to negative lead 27 through terminal 13, lead 11, temperature responsive resistance 10 and lead 12 and collector electrode 31 connected to negative lead 27 from terminal 13 on negative lead 27 through lead 14, rebalance potentiometer 18 having wiper 17, control point potentiometer 20, having wiper 21, and terminal 24. A second transistor 40 having collector electrode 41, emitter electrode 42 and base electrode 43, is shown with base electrode 43 connected to collector electrode 31 on transistor 30 through lead 25 and terminal 24, emitter electrode 42 connected to positive lead 26 from terminal 34 on positive lead 26, through lead 35, field coil 36 on motor 80 and lead 37 and collector 41 connected to negative lead 27 from terminal 44 on negative lead 27, through lead 45, resistor 46, lead 47 and terminal 48. A third transistor 50 having collector electrode 51, emitter electrode 52 and base electrode 53, is shown with base electrode 53 connected to collector electrode 41 on transistor 40 through lead 54, field coil 38 on motor 80 and terminal 48, emitter electrode 52 connected to positive lead 26 from terminal 60 on positive lead 26, through lead 61, resistor 62 and lead 63, collector 51 connected to negative lead 27 from terminal 55 on negative lead 27, through lead 56, relay winding 57 and lead 58. A relay 69 comprises relay winding 57, movable contact 67, operable in response to the energization of relay winding 57 through a mechanical connecting means 68, stationary contacts 70 and 71 and a biasing spring 66 connected to bias movable contact 67. Relay 69 is adapted to operate as a three position switch with a center off position. The armature coil of motor 80, having terminals 92 and 93, is connected across negative lead 27 and positive lead 26 from terminal 83 on negative lead 27, lead 82, armature coil terminal 93 on motor 80, armature coil terminal 92 on motor 80, lead 81, terminal 73 which is connected to relay contacts 70 and 71 through leads 74 and 72 respectively, movable relay contact 67, lead 65 to terminal 64 on positive lead 26. Motor 80 is operatively connected to controlled device 90 through driving means 91 and is also connected to wiper 17 on rebalance potentiometer 18 through driving means 84.

*Operation of Figure 1*

Initially, it may be assumed that the controlled condition is in a desired state. At this time the motor 80 should not be operative, movable relay contact 67 should be in its center position, and the currents through field coils 36 and 38 should be equal. Control point potentiometer 20 is provided to adjust the apparatus for balance at the desired operation point and may be calibrated to read directly in units corresponding to the condition to be controlled. Resistor 46 is chosen so that at the balance condition, that is when the current through relay winding 57 is of such value that movable relay contact 67 is in the center or off position and motor 80 is not connected in circuit, the currents through field windings 36 and 38 are of equal magnitude. Assuming now that a change in the desired condition or temperature has occurred in a positive direction, the resistance of temperature responsive resistance 10 will decrease, causing the emiter to base current in transistor 30 to increase. This will cause an increase in collector current in transistor 30 which in turn will cause a decrease in the emitter to base current of transistor 40 and thereby a decrease in the collector current of transistor 40 which in turn allows an increase in the emitter to base current of transistor 50 and thereby an increase in the collector current of transistor 50. The decrease in emitter to base current of transistor 40 with resulting decrease in conductivity of transistor 40, and the increase in the emitter to base current of transistor 50 will cause an unbalance in the currents through field coils 36 and 38, with the current in field coil 38 predominating. The increase in collector current in transistor 50 provides a higher energization of relay winding 57 which in turn causes movable contact 67 to engage relay contact 70 and apply current to the armature of motor 80 which will then rotate in a direction in accordance with the field winding having the predominating energization, field coil 38. Motor 80 drives controlled device 90 through driving means 91 to effect a change of operation to provide the desired condition, and at the same time serves to decrease the value of rebalance potentiometer 18 through driving means 84 to rebalance the apparatus. The decrease in rebalance potentiometer 18 causes an increase in the emitter to base current of transistor 40, an increase in the collector current of transistor 40, a decrease in the emitter to base current of transistor 50 and a decrease in the collector current of transistor 50. This tends to rebalance the apparatus because the decrease in the energization of the relay allows relay contact 67 to move to the center off position. The current flowing through field coils 36 and 38 will again be substantially equal.

Assuming now that the temperature decreases, the resistance of temperature responsive resistance 10 will increase, causing a decrease in the emitter to base current of transistor 30 and a decrease in the collector current of transistor 30 with the effect that the emitter to base current of transistor 40 will increase and cause an increase in the collector current of transistor 40. The emitter to base current of transistor 50 will decrease, causing a decrease in the collector current of transistor 50 and a consequent decrease in the current through relay winding 57. Now, the current through field coil 36 of motor 80 will be greater than the current through field coil 38 of motor 80 and field coil 36 will predominate. At the same time the reduced current through relay winding 57 decreases the energization of the winding and allows movable contact 67, which is biased by spring 66, to contact relay contact 71 to energize the armature of motor 80. Motor 80 becomes operative in the opposite direction to that previously described, to drive controlled device 90 through driving means 91 in the opposite direction, and also drive rebalance potentiometer wiper 17 on rebalance potentiometer 18 through driving means 84 to increase the resistance of rebalance potentiometer 18 and effect a rebalance of the apparatus.

FIGURE 2

Referring now to Figure 2, I have shown a second embodiment of my invention in which the armature of motor 80 is connected directly to the output terminals of the amplifier. Condition responsive means 100, shown as a bridge, is connected to a transistor amplifier the output of which is connected through field coils 154 and 164 to motor 170. Motor 170 is operatively connected to controlled device 180. A source of direct current potential is provided and is shown as a battery 176.

Bridge 100 comprises condition responsive element 101, shown as a temperature responsive resistance, terminal 102, resistor 103, terminal 104, resistor 105, terminal 106, resistor 107, and terminal 108. A battery 110 is shown connected to terminals 102 and 106 of bridge 100. Transistor 130 is shown comprising collector electrode 131, emitter electrode 132 and base electrode 133. Terminal 108 of bridge 100 is connected to base electrode 133 of transistor 130 through lead 111, terminal 112 and lead 115. Base electrode 133 of transistor 130 is also connected to negative lead 127 through lead 115, terminal 112, resistor 190, control point potentiometer 123 having wiper 124 and lead 127. Collector electrode 131 of transistor 130 is connected to negative lead 127 through terminal 136, resistor 135 and terminal 134 on negative lead 127. Emitter electrode 132 on transistor 130 is connected to positive lead 157 at terminal 156. Transistor 150 having collector electrode 151, emitter electrode 152 and base electrode 153 is shown connected in circuit with base electrode 153 connected to collector electrode 131 of transistor 130 through lead 137 and terminal 136, emitter electrode 152 connected to positive lead 157 at terminal 158 and collector electrode 151 connected to negative lead 127 through field coil 154, terminal 155, lead 171, armature terminal 181 on motor 170, armature terminal 182 on motor 170, lead 172 and terminal 175 on negative lead 122. Transistor 140 having emitter electrode 141, collector electrode 142 and base electrode 143 is shown connected in circuit with base electrode 143 connected to terminal 104 on bridge 100 through lead 116, terminal 114 and lead 113. Base electrode 143 is also connected to negative lead 127 through lead 116, terminal 114, control point potentiometer 117 having wiper 118, terminal 144 lead 122, terminal 175 and terminal 174. Emitter electrode 141 is connected to positive lead 157 at terminal 156 and collector electrode 142 is connected to negative lead 122 through terminal 146, resistor 145 and terminal 144. Transistor 160 having an emitter electrode 161, collector electrode 162 and base electrode 163 is shown having base electrode 163 connected to collector electrode 142 on transistor 140 through lead 147 and terminal 146, emitter electrode 161 connected to positive lead 157 at terminal 158 and collector electrode 162 connected to negative lead 122 through field coil 164, lead 165, terminal 155, lead 171, armature terminal 181, motor 170, armature terminal 182, lead 172 and terminal 175. A battery 176 is shown having a negative terminal 177 connected to negative lead 127 and a positive terminal 178 connected to positive lead 157. Negative lead 122 is connected to negative lead 127 at terminal 174.

Operation of Figure 2

It may be assumed that the resistances of control point potentiometers 117 and 123 have been adjusted so that the current flow through transistors 130 and 140 and therefore transistors 150 and 160 respectively is equal. The currents flowing through field coil 154 and field coil 164 will be equal so that motor 170, although energized, will not rotate because the opposing effect of the equal current flow in each of the field coils, 154 and 164 results in substantially no field flux. Then for an increase or decrease in temperature the resistance of temperature responsive resistance 101 in bridge 100 will increase or decrease with the result that a voltage of one polarity or another will appear between bridge terminals 104 and 108. Assuming that terminal 108 becomes negative with respect to terminal 104 the following changes in operation occur, the emitter to base current of transistor 130 will increase with a resultant increase in collector current thereby causing a decrease in the emitter to base current of transistor 150 with a resultant decrease in collector current in transistor 150 thereby decreasing the current flow through field coil 154. At the same time the emitter to base current in transistor 140 decreases with a resultant decrease in collector current, and the emitter to base current in transistor 160 increases with a resultant increase in collector current thereby increasing the current flow through field coil 164. The result is that the field produced by field coil 164 will predominate and, since the armature in motor 170 is energized, it will rotate in the direction of the predominating field coil. Assuming an output from bridge 100 of the opposite polarity of the one above discussed, the respective current through the field coils will be reversed as to relative strength and the field produced by field coil 154 will predominate causing the motor to rotate in the opposite direction. It will be noted in this case that there is a constant current through the armature of motor 170, but that the current through the field coils will vary in an inverse manner to provide reversal of rotation in accordance with the output of bridge 100.

FIGURE 3

The apparatus in Figure 3 comprises a temperature responsive resistance means 200 which is connected in series with a battery 205 across the input terminals of transistors 220 and 230 to control the conductivity thereof, and field coils 225 and 234 connected to the output terminals of transistors 220 and 230. A battery 245 provides a source of potential for the circuit.

Transistor 220 having collector electrode 221, emitter electrode 222 and base electrode 223, is shown with emitter electrode 222 connected to positive supply lead 228 at terminal 227, base electrode 223 connected to negative supply lead 243 through lead 215, terminal 208, control point potentiometer 210 having a wiper 211, resistor 260, lead 214 and terminal 236 and collector electrode 221 connected to negative lead 214 through field coil 225, terminal 226, lead 241, armature terminal 252, motor 240, armature terminal 253, lead 242 and terminal 236 on negative lead 214. Transistor 230 having emitter electrode 231, collector electrode 232 and base electrode 233, is shown with emitter electrode connected to positive lead 228 at terminal 227, collector electrode 232 connected to negative lead 243 through field coil 234, lead 235, terminal 226, lead 241, armature terminal 252, motor 240, armature terminal 253, lead 242 and terminal 236 and base electrode 233 connected to negative lead 243 through lead 206, battery 205, control point potentiometer 204 having a wiper 203, temperature responsive resistance 200, lead 207, terminal 208, control point potentiometer 210, resistor 260, lead 214 and terminal 236. Motor 240 is operatively connected through driving means 251 to the controlled device 250.

*Operation of Figure 3*

Starting again with the balanced condition where motor 240 is not rotating, that is assuming that control point potentiometer 204 and 210 have been adjusted to provide equal collector currents and therefore equal currents through opposing field coils 225 and 234, the following changes in operation occur; with an increase or decrease in temperature, the resistance of temperature responsive resistance 200 increases or decreases, and motor 240 becomes operative. Assuming that the resistance of temperature responsive resistance 200 decreases, the emitter to base current in transistor 220 will decrease and the collector current in transistor 220 will decrease with a resultant decrease in the current flowing through field coil 225. At the same time the emitter to base current in transistor 230 will increase and the collector current in transistor 230 will increase with a resultant increase in the current through field coil 234. The motor 240 will then operate in a direction dependent on the relative currents through field windings 225 and 234. For an increase in the resistance of temperature responsive resistance 200 the opposite is true and the current flowing through field coil 225 will be greater than the current flowing through field coil 234 and motor 240 will rotate in the opposite direction.

In the above description, the values of the various components have not been given. Purely by way of illustration, the following values were used, for example, in the modification of Figure 2. It is believed unnecessary to give the values in the case of the other figures as these should be obvious.

| Reference character: | Value |
|---|---|
| 117 | 100,000 ohms. |
| 123 | 100,000 ohms. |
| 135 | 2,700 ohms. |
| 145 | 2,700 ohms. |
| 190 | 39,000 ohms. |
| 130 | 2N6 transistor. |
| 140 | 2N6 transistor. |
| 150 | 2N57 transistor. |
| 100 | 2N57 transistor. |
| 170 | 32 v. D. C. motor. |
| 176 | 32 v. battery. |

The condition responsive means shown herein as a temperature responsive resistance element is used merely for the purpose of illustration and may be replaced by any suitable condition responsive device or any device which will vary the conductivity of the amplifier as for example a rheostat. It will also be noted that the direct current motor used herein may also be replaced by any suitable device.

It will be understood that modifications may be made in the design and arrangement of the apparatus I have shown in my preferred embodiments without departing from the spirit of the invention.

What is claimed is:

1. Proportional control apparatus comprising; first, second and third semiconducting devices, each having emitter, base and collector electrodes; a source of direct current potential; direct current motor means having an armature winding and first and second field windings; temperature responsive resistance means; means connecting the base electrode of said first semiconducting device and said temperature responsive resistance in circuit with said source of potential; means connecting the emitter electrode of said first semiconducting device to said source of potential; variable resistance means connecting the collector electrode of said first semiconducting device to said source of potential, said variable resistance means operatively connected to said motor means so as to effect a rebalance of said control apparatus; first resistance means connecting the collector electrode of said second semiconducting device to said source of potential; means interconnecting the base electrode of said second semiconducting device and the collector electrode of said first semiconducting device; means connecting said first motor field winding intermediate the emitter electrode of said second semiconducting device and said source of potential; second resistance means connecting the emitter electrode of said third semiconducting device to said source of potential; means connecting said relay means intermediate the collector electrode of said third semiconductor and said source of potential; means connecting said second field coil winding intermediate the base electrode of said third semiconducting device and the collector electrode of said second current conducting device; and means, including a double throw single pole switch operable by said relay winding, connecting said motor armature in circuit with said source of potential, said motor being operable in one direction or the other in accordance with the increase or decrease of current flow through said field windings and said armature in response to said temperature responsive resistance.

2. Motor control apparatus comprising; transistor amplifier means including at least first and second stages, each of said stages having an input and an output terminal and a terminal common to each of said terminals; condition responsive means; motor means including a pair of field windings; a source of direct current potential; relay means; and circuit means connecting said amplifier to said source of direct current potential including, means connecting said condition responsive means intermediate said source of direct potential and the input terminal of said first stage, means connecting one of said field coils intermediate said source of direct potential and the common terminal of said first stage, means connecting the other of said field windings intermediate the output terminal of said first stage and the input terminal of said second stage, and means connecting said relay means intermediate the output terminal of said second stage and said source of direct current potential.

3. Control apparatus comprising; a source of direct current potential; electrical translating means having a pair of control windings to be differentially energized in response to said source of signal; first and second semi-conductor devices, each having an input terminal, an output terminal, and a common terminal; a source of direct current; circuit means connecting said source of signal to the input terminal of said first semi-conductor device; circuit means connecting one of said control windings intermediate the common terminal on said first semi-conductor device and said source of direct current; circuit means connecting the output terminal on said first semi-conductor device to said source of direct current; circuit means connecting the other of said control windings intermediate the output terminal of said first semi-conductor device and the input terminal of said second semi-conductor device; circuit means connecting the common terminal of said second semi-conductor device to said source of direct current; and circuit means connecting the output terminal of said second semi-conducting device to said source of direct current.

4. Motor control apparatus comprising; transistor amplifying means including at least three stages; direct current motor means having a pair of field windings; a source of direct current; relay means; condition responsive means connected in conduction controlling relationship with said first amplifier stage; circuit means connecting one of said field windings in the output circuit of said second stage; circuit means including the other of said field windings connecting the output circuit of said second stage to the input circuit of said third stage; circuit means connecting said relay means in the output circuit of said third stage; and circuit means connecting said source of direct current in energizing relationship with said amplifying means.

5. Motor control apparatus comprising; condition responsive variable impedance means; a first source of direct potential; electrical signal translating means having at least a pair of control windings; a pair of semi-conductor devices each having first, second and third terminals; a source of adjustable direct current; means connecting each of said second terminals to said first source of direct current; circuit means connecting said source of adjustable direct current and said condition responsive variable impedance means intermediate said first terminals, said source of adjustable direct current being adjusted to a magnitude which will balance the conductivity of said semi-conductor devices; circuit means connecting one of said first terminals to said first source of direct current; circuit means connecting one of said control windings intermediate one of said third terminals and said first source of direct current; and circuit means connecting another of said control windings intermediate the other of said third terminals and said first source of direct current.

References Cited in the file of this patent

UNITED STATES PATENTS

| | | |
|---|---|---|
| 2,435,965 | Hartig | Feb. 17, 1948 |
| 2,456,573 | White et al. | Dec. 14, 1948 |
| 2,698,392 | Herman | Dec. 28, 1954 |